Jan. 26, 1937. J. H. REYNOLDS 2,068,709
AIR COOLING MEANS FOR VEHICLES
Filed Feb. 18, 1935 3 Sheets-Sheet 1

Inventor
Joseph H. Reynolds
By Jack A. Ashley
Attorney

Jan. 26, 1937.  J. H. REYNOLDS  2,068,709
AIR COOLING MEANS FOR VEHICLES
Filed Feb. 18, 1935  3 Sheets-Sheet 2

Inventor
Joseph H. Reynolds
By Jack A. Elley
Attorney

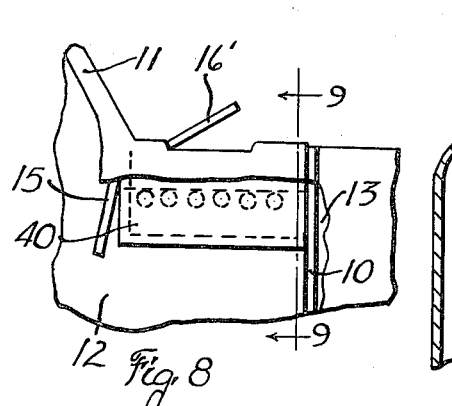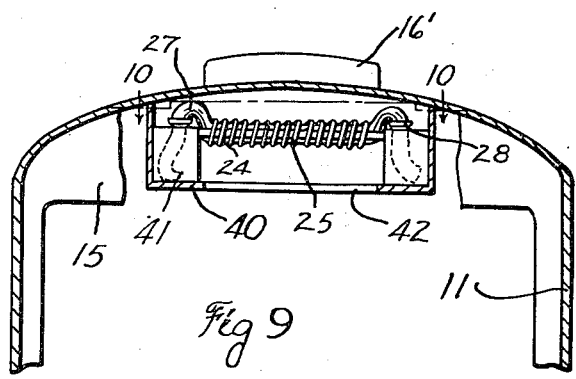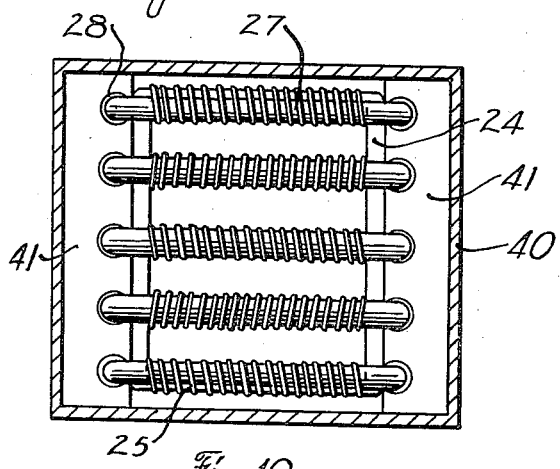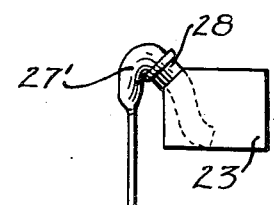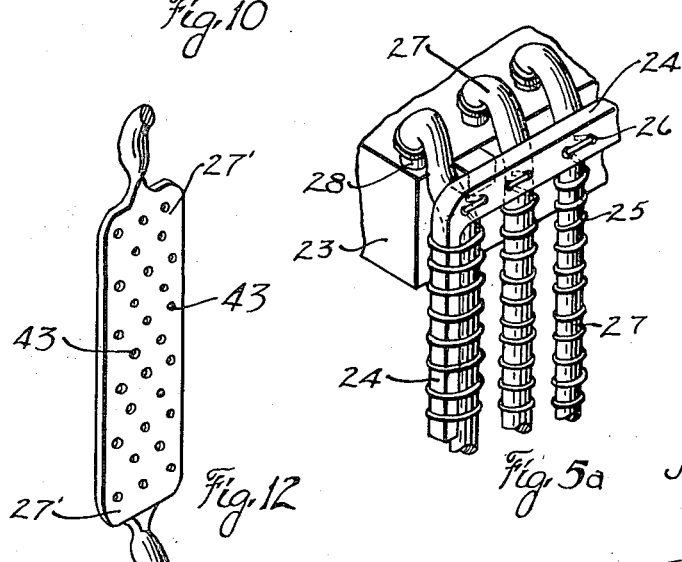

Patented Jan. 26, 1937

2,068,709

UNITED STATES PATENT OFFICE 2,068,709

AIR COOLING MEANS FOR VEHICLES

Joseph H. Reynolds, Cisco, Tex.

Application February 18, 1935, Serial No. 7,051

3 Claims. (Cl. 261—99)

This invention relates to new and useful improvements in air cooling means for vehicles.

One object of the invention is to provide improved means for directing cooled air currents into the interior of a vehicle, whereby said interior is cooled and the comfort of the occupant is increased.

An important object of the invention is to provide cooling means including a plurality of moisture absorbing wicks disposed in the forward portion of a vehicle together with means for directing air currents through said wicks into the interior of said vehicle.

Another object of the invention is to provide cooling means including a pair of water reservoirs spaced apart and moisture absorbing elements disposed between said reservoirs and having their ends extending into said reservoirs, whereby the elements are kept saturated by capillary attraction.

A further object of the invention is to provide improved cooling means for a motor vehicle which may be mounted before the dash board of said vehicle on each side of the motor of said vehicle and arranged to direct cool air currents into the interior of said vehicle; said cooling means being constructed so that it is entirely separate from the motor compartment, whereby it is unaffected and does not act upon the air heated by the operation of the motor.

Still another object of the invention is to provide water reservoirs for receiving the ends of moisture absorbing elements, whereby said elements are kept saturated at all times, the elements being connected with the reservoirs by an improved and leak proof coupling.

A still further object of the invention is to provide an improved cooling means for a motor vehicle which may readily be installed in the usual motor vehicle between the instrument panel and dashboard thereof and positioned in such a way that the air currents entering through the ordinary cowl ventilator are directed over said means to cool the interior of the vehicle.

A construction designed to carry out the invention will be hereinafter described, together with other features of the invention.

Figure 1:
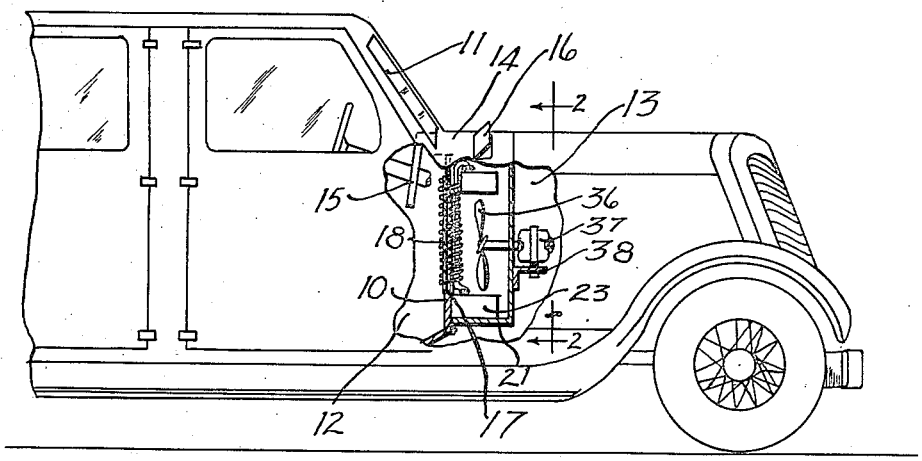
Figure 2:
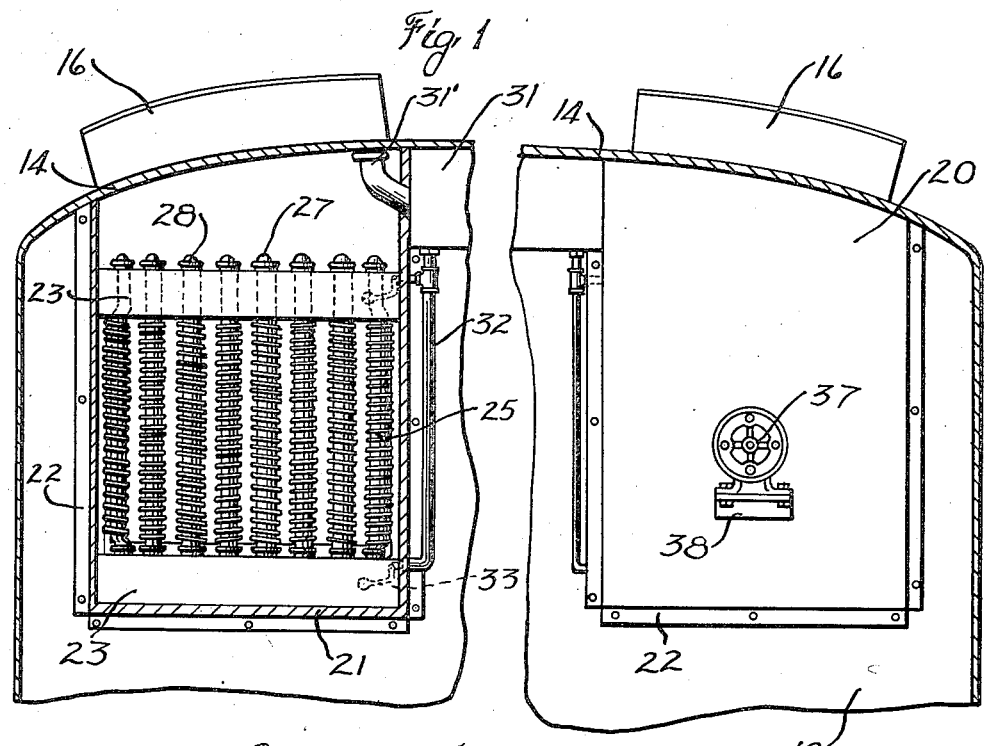
Figure 7A:
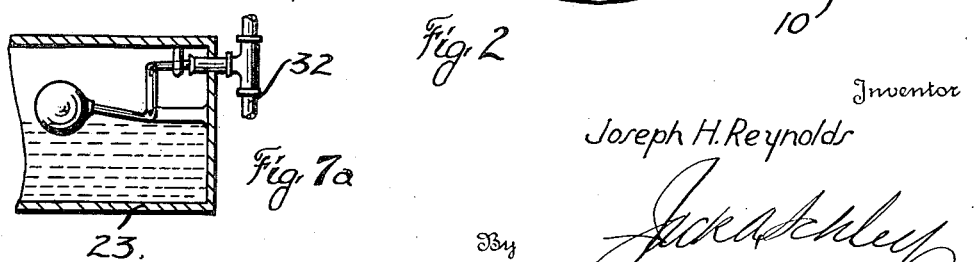
Figure 3:
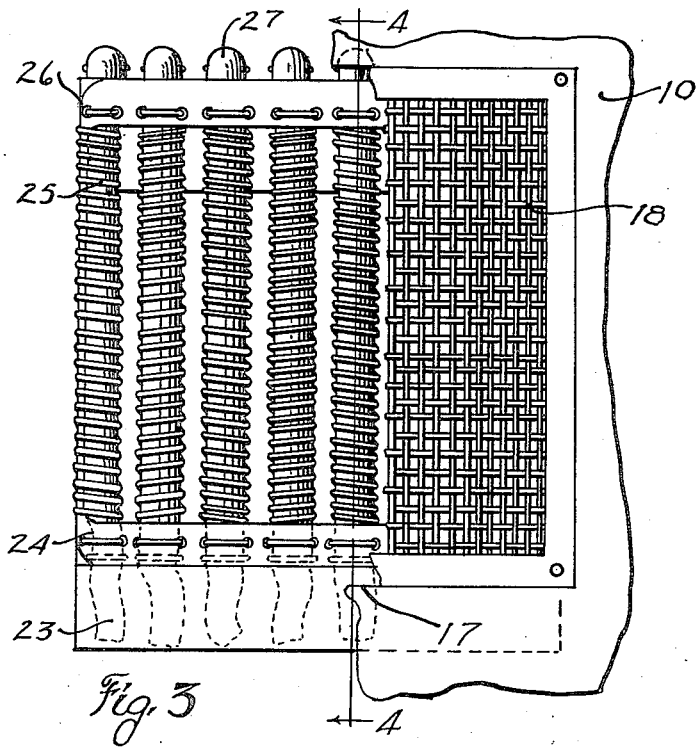
Figure 4:
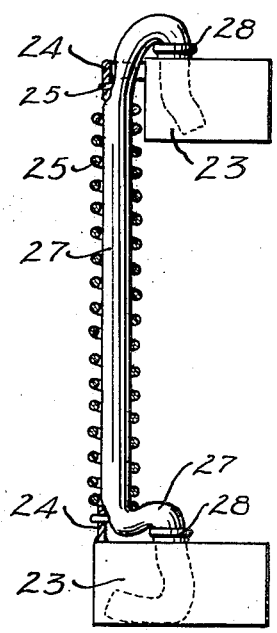
Figure 5:
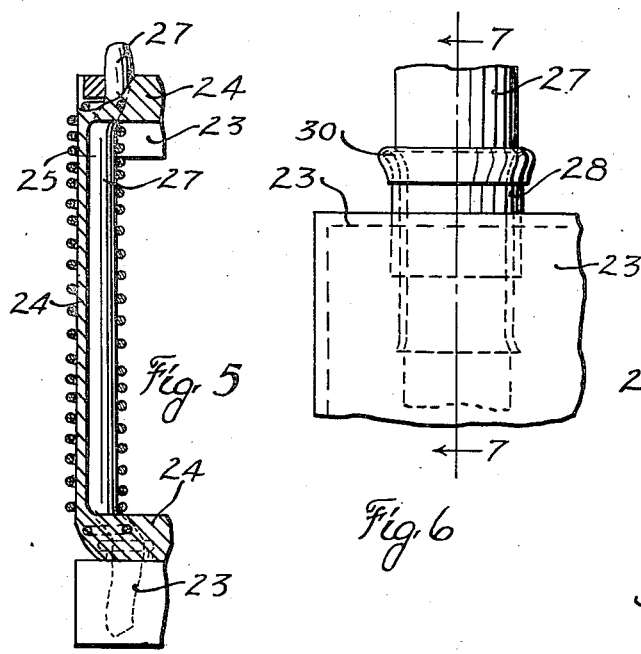
Figure 6:
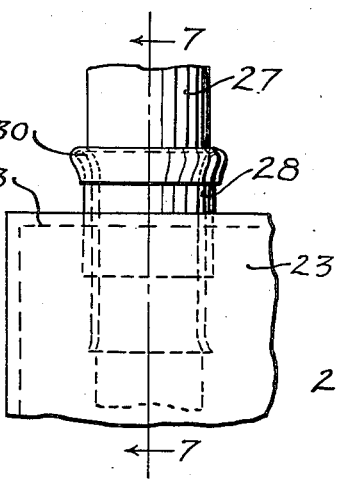
Figure 7:
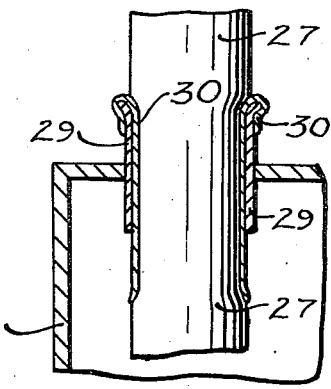

The invention will be more readily understood from a reading of the following specification and by reference to the accompanying drawings, in which an example of the invention is shown, and wherein:

Figure 1 is a view, partly in elevation and partly in section, of a cooling means constructed in accordance with the invention, mounted in a motor vehicle, Figure 2 is a transverse vertical, sectional view, taken on the line 2—2 of Figure 1, and showing one of the housings in section, Figure 3 is an enlarged front elevation of the same, showing a portion of the dashboard of the vehicle broken away, Figure 4 is a vertical, sectional view taken on the line 4—4 of Figure 3, Figure 5 is a view similar to Figure 3, showing one end of the frame and coils in section, Figure 5a is an isometric view of one corner of the supporting frame for the coils, Figure 6 is an enlarged elevation of one of the wick couplings, Figure 7 is a vertical, sectional view of the same, Figure 7a is a sectional detail view of one of the float control valves of each reservoir, Figure 8 is a side elevation of another form of the invention mounted in a vehicle shown in section, Figure 9 is a transverse, vertical, sectional view, taken on the line 9—9 of Figure 8, Figure 10 is a horizontal, cross-sectional view, taken on the line 10—10 of Figure 9, and Figures 11 and 12 are views showing another form of wick, which eliminates the use of the coils.

In the drawings, the numeral 10 designates the dashboard of a motor vehicle 11. This dashboard separates the interior 12 of the vehicle from the motor compartment 13. The usual practice has been to mount a ventilator door centrally in the cowl 14 between the dashboard 10 and instrument panel 15, whereby when said door is open, air currents are directed downwardly onto the floor, at the forward portion of the interior of the vehicle.

In carrying out the invention, the cowl 14 is extended so that a pair of ventilator doors 16 may be mounted therein forwardly of the dashboard 10. The doors 16 are located, one on each side of the cowl, as shown in Figure 2. It is obvious that when the doors 16 are open air currents are directed downwardly against the front of the dashboard. Openings 17 are provided in the dashboard, whereby these air currents may pass directly into the interior of the car. The openings are preferably covered with suitable grilles 18 (Figure 3).

For cooling the air currents passing through the ventilator doors into the interior 12 of the car, a pair of cooling units 20 are provided. These units are mounted directly beneath the doors 16 and extend into the motor compartment on each side of said motor (Figure 2). The units are constructed exactly alike and a description of one will suffice.

Each unit includes a casing or housing 21 which is provided with flanges 22 along its rear edge so that the casing may be readily secured to the forward side of the dashboard 10. The casing completely surrounds the opening 17 in said dashboard and has its upper end open. The upper edge of said casing engages the underside of the cowl 14 around the door 16 and it is obvious by observing Figure 1 that air can enter the casing only through the ventilator door and can escape only through the opening 17 in the dashboard. Therefore, the air passing through the ventilator door must pass through the casing. It is pointed out that the particular location of the ventilating doors is unimportant as they could be located in the sides of the hood of the vehicle in direct communication with the interior of the casings 21.

For cooling this air passing through the casing a pair of water tanks or reservoirs 23 are mounted within said casing. One of the tanks is positioned near the upper end while the other tank is located at the lower end of said casing and the tanks are preferably welded therein, although they may be fastened in any suitable manner. A rectangular frame, or support 24, which is preferably made flat with rounded corners, is disposed vertically within the casing between the tanks. The frame is secured, by welding or other means, to the tanks and when in position is adjacent the opening 17 in the dashboard. It is pointed out that although the frame is shown as rectangular, its particular size and shape is subject to variation.

Spring coils 25 are disposed within and across said frame and extend vertically of the casing 20. The coils may be formed of any suitable material but it is preferable to form them of wire which is rust-proof and capable of considerable flexibility without losing the shape into which it is formed. The frame should also be rust-proof. While the ends of the coils may be connected or attached to the frame in any desired manner, a simple expedient is in passing the end of the coil wire through a pair of holes 26 (Figure 3) in the frame and bending the end of the wire to rest against the opposite side of the frame.

The coils are tensioned sufficiently to prevent sagging, but if desired all or part of the coils may be extended and thus tensioned when placed in the frame. The coils are shown side by side, or parallel and each coil is spaced from those on each side of it. It is obvious that the number of coils may vary and only sufficient coils to cover the opening 17 in the dashboard are necessary. Further, it is pointed out that the coils extend across the opening, whereby air currents passing from within the casing into the interior of the car must pass through the coils.

A cylindrical wick 27 or similar element of absorbent, or moisture exuding material, such as felt, fabrics, or the like, is inserted into the coils 25. The wicks are preferably of a smaller diameter than the interior of the coils, so that when they are moistened and swell, they will not protrude between the turns of the coils or buckle between the sides of the frame. The ends of each wick extend beyond the ends of the coils and the lower end of each wick depends into the lower tank 23, being connected thereto by a coupling 28, while the upper end of each wick extends into the upper tank 23, being fastened thereto by a similar coupling. A coupling is provided for the ends of each wick and is shown in detail in Figures 6 and 7. Each coupling comprises a collar 29, preferably of metal which is inserted in the top of each tank. The upper end of the collar is flared slightly at its upper end.

In inserting and fastening the end of one of the wicks in said coupling, a sleeve 30, preferably made of rubber, or resilient material is slipped over the wick and surrounds the same above its outermost end and is held in position by frictional engagement. This sleeve with the wick therein is then inserted into the collar (Figure 7) and said sleeve is of a greater length than the collar, whereby the ends of the sleeve extend beyond the ends of the collar. The extending upper end of the sleeve is then turned back over the flared upper end of the collar and this, together with the frictional engagement of the sleeve in the collar, holds the wick in position. It is obvious that the extreme outer ends of the wick fall into the tanks 23.

The tanks are filled with water and due to capillary attraction the wicks are kept constantly saturated. Therefore, air passing through the casing and into the interior of the vehicle must pass through and around the saturated wicks, whereby said air is cooled. For keeping the tanks 23 of each unit filled, a central enlarged reservoir 31 is mounted under the hood of the vehicle between the casings 20. This reservoir is connected with each tank 23 by pipes 32 and at the point of connection between each tank and its supply pipe 32, a float valve 33 is provided. It is obvious that the float valve is operated by the water level in the tanks, whereby said tanks are kept filled automatically at all times. The wicks are kept saturated at all times by the capillary attraction and once inserted need no further attention. The reservoir 31 has a nozzle 31' for refilling.

For assuring a constant draft of air through the openings 17 into the interior of the vehicle, a fan 36, which is driven by an electric motor 37 is mounted in the front wall of the casing 21 of each cooling unit. The fan is mounted within the casing between the tanks 23, while the driving motor 37 is supported on a bracket 38 on the forward end of said casing. The fan is arranged to draw the air into the casing through the ventilating door and to force it through the saturated wicks into the interior of the vehicle. The wicks serve to cool the air and it will be seen that whether the vehicle is moving or standing still, a constant draft of cool air is being discharged into the interior of said vehicle. It is obvious that when the vehicle is moving, air will be forced downwardly into the casings 21, and it would be possible to eliminate the fan and utilize the air forced into the casings by the moving vehicle. It is pointed out the coils are merely a means for supporting the wicks to hold them in position, and any suitable bracing means may be employed.

In Figures 8 to 10, I have shown a modified form of the invention. This form is arranged to be mounted in the usual motor vehicle, without changing the structure of said vehicle. As clearly shown in Figures 8 and 9, this type comprises a single casing 40 which is arranged to fit in the space beneath the instrument panel 15 and the dashboard 10 directly beneath, and communicating with the usual central ventilating door 16'. Two tanks 41 are mounted in the same horizontal plane on opposite sides of the casing and the frame 24 is disposed horizontally between the tanks. The structure of the coils and wicks, as well as the connection between the wicks and tanks is the same. The bottom of the casing is provided with an opening 42, whereby the air currents entering through the ventilating door 16' must pass through and around the coils and wicks before discharging into the interior of the car. The wicks are maintained saturated at all times by the capillary attraction and the air is cooled in the same way as in the first form.

In Figures 11 and 12, I have shown another form of wick 27'. In this form, the coils are eliminated and the wick 27' is flat substantially throughout its length. Its ends are cylindrical however, so as to be connected in the couplings 28. These flat wicks are made heavy enough to retain their shape and when stretched between the tanks, as shown in Figure 11, will remain in position. Each wick is provided with a plurality of holes 43 whereby the air may pass through said wicks. Capillary attraction is also depended upon to maintain saturation of the wicks. The flat wicks may be employed in either form, and if it is found that after usage they begin to sag, any suitable bracing means, such as a small rod may be utilized to brace said wicks.

It is brought out that the arrangement of the cooling unit is such that once it has been installed, the action is entirely automatic. There are no adjustments to be made and all that is necessary is to occasionally fill the water reservoir and tanks. The wicks remain saturated so long as the tanks have water therein. The fan is entirely eliminated in the second form and it is obvious that the first form could, if desired, be efficiently operated without said fan.

What I claim and desire to secure by Letters Patent is:

1. An apparatus for cooling vehicles including a cooling unit comprising, a pair of cooperatively opposed liquid tanks, means for maintaining liquid in said tanks at a given level, moisture absorbing wick elements disposed between the tanks in parallel relation to each other and having their ends extended into the liquid within the tanks, means for supporting the wick elements throughout their lengths between the tanks, means for securing said wick elements to the respective tanks comprising, a restricted tubular support on the tank for each element and a resilient sleeve on the adjacent end portions of the respective elements, each sleeve being inserted in a tubular support and having its end portion turned over the adjacent end portion of said tubular support, and means for directing air currents between and around said elements.

2. An apparatus for cooling vehicles comprising, a casing arranged to be mounted on the dashboard and under the cowl of the vehicle, the cowl having a controllable air inlet, a cooperatively opposed pair of liquid tanks mounted within said casing at the opposite ends thereof, means for maintaining liquid in said tanks at a given level, a frame mounted between the tanks, a plurality of moisture absorbing wick elements disposed across the frame in parallel relation to each other, each wick element being supported exposedly throughout its length within the frame and having its opposite ends extending into said tanks, the dashboard having an opening for directing air currents through said casing and between and about said wick elements into the interior of the vehicle.

3. An apparatus for cooling vehicles comprising, a casing mounted on the dashboard and under the cowl of the vehicle, a cooperatively opposed pair of liquid tanks mounted within the casing, a frame mounted between the tanks, a plurality of moisture absorbing wick elements disposed across the frame, each wick element having its ends extended beyond the ends of the frame, a tubular coupling in the tanks for each extended end of each wick element, elastic sleeve members fitted tightly on the end portion of said wick elements and inserted in the respective tubular couplings, the end portions of said elastic sleeve members being turned over the adjacent end portions of said tubular couplings, and means for supporting said wick elements exposedly between the ends of said frame.

JOSEPH H. REYNOLDS.